US012330328B2

(12) United States Patent
Quercia

(10) Patent No.: US 12,330,328 B2
(45) **Date of Patent: *Jun. 17, 2025**

(54) DIE BLOCK, STEEL-RULE DIE ASSEMBLY COMPRISING THE SAME, AND METHOD THEREOF

(71) Applicant: DIEBEC MATRICES LTEE, Pointe-Claire (CA)

(72) Inventor: Paolo Quercia, Pierrefonds (CA)

(73) Assignee: Diebec Matrices LTEE (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/529,139

(22) Filed: Dec. 5, 2023

(65) Prior Publication Data

US 2024/0359353 A1 Oct. 31, 2024

Related U.S. Application Data

(63) Continuation of application No. 17/816,518, filed on Aug. 1, 2022, now Pat. No. 11,833,705, which is a continuation of application No. 16/490,687, filed as application No. PCT/CA2018/050238 on Mar. 1, 2018, now Pat. No. 11,400,615.

(60) Provisional application No. 62/465,401, filed on Mar. 1, 2017.

(51) Int. Cl.

*B26D 7/26* (2006.01)
*B26F 1/40* (2006.01)
*B26F 1/44* (2006.01)

(52) U.S. Cl.

CPC .............. *B26D 7/2614* (2013.01); *B26F 1/40* (2013.01); *B26F 1/44* (2013.01); *B26D 2007/2607* (2013.01); *B26F 2001/4445* (2013.01); *B26F 2001/4463* (2013.01); *Y10T 83/9459* (2015.04); *Y10T 83/9476* (2015.04)

(58) Field of Classification Search

CPC ............ Y10T 83/9476; Y10T 83/9457; Y10T 83/9459; Y10T 83/9302; Y10T 83/06; B26D 7/2614; B26D 2007/2607; B26F 1/40; B26F 1/44; B26F 1/46; B26F 2001/4445; B26F 2001/4463

USPC ........................................................ 76/107.8

See application file for complete search history.

(56) References Cited

U.S. PATENT DOCUMENTS 6,779,426 B1 * 8/2004 Holliday ............. B21D 37/205 83/698.21

* cited by examiner

*Primary Examiner* — Phong H Nguyen

(74) *Attorney, Agent, or Firm* — Price Heneveld LLP

(57) ABSTRACT

The invention relates to steel-rule cutting dies having a die block with at least one kerf configured to receive a corresponding steel-rule intended to be partially inserted into the kerf. The die block also has at least one element having magnetic properties, such as for instance a magnet, located or embedded in proximity to each kerf for providing a magnetic field that retains the steel-rule when the steel-rule is received into the corresponding kerf. The presence of the magnetic element(s) in proximity to the kerf(s) allows maintaining the corresponding rule(s) in position within its kerf even if the kerf is cut "loosely". The corresponding rule may be quickly and easily inserted and accurately maintained even if the die block expands or retracts under atmospheric variations. Among other advantages, the invention allows better stability of the cutting-die, faster leveling on press, and increases the number of re-knifing and longer run-time.

20 Claims, 15 Drawing Sheets

DIE BLOCK, STEEL-RULE DIE ASSEMBLY COMPRISING THE SAME, AND METHOD THEREOF

CROSS-REFERENCE TO RELATED APPLICATIONS

The present patent application claims the benefits of priority of commonly assigned United-States Patent Application No. 62/465,401, entitled "DIE FOR DIE CUTTING, KIT FOR ASSEMBLING THE SAME, AND CORRESPONDING METHODS OF ASSEMBLING, OPERATING AND USE ASSOCIATED THERETO" and filed at the U.S. Patent and Trademark Office on Mar. 1, 2017, the content of which is incorporated herein by reference. The present patent application is a Continuation of U.S. patent application Ser. No. 17/816,518 filed on Aug. 1, 2022, which is itself a Continuation of U.S. patent application Ser. No. 16/490,687 filed on Sep. 3, 2019, the content(s) of which is (are) also incorporated herein by reference.

FIELD

The present invention generally relates to dies, and more particularly, to steel-rule dies.

BACKGROUND

A die is a specialized tool used in manufacturing industries to cut, bend and/or shape materials mostly using a press. Like molds, dies are generally customized to the item they are used to create. Products made with dies range from simple paper clips or carton boxes to complex pieces used in advanced technology. Forming dies is typically performed by die makers and put into production after mounting into a press.

Steel-rule die, also known as steel-rule cutting dies, are used for cutting and/or shaping sheets of materials comprising plastics, cork, felt, fabrics, cartons and paperboard. The cutting surface of the die is the edge of hardened steel strips, known as steel rule or merely as "rule" hereinafter. Grooves are made with a saw or laser-cut in wooden or plywood board to position the rules. These groves are also known as "kerfs". The mating die can be a flat piece of hardwood or steel, a male shape that matches the workpiece profile, or it can have a matching kerf that allows the rule to nest into. Rubber strips are glued beside the rules to eject the sheet once processed.

Dies are used for cutting and also for embedding sections of carton or paper sheets, drawing lines and curves, forming cut-out sections and bending/folding lines.

The following detailed drawbacks may be associated with steel-rule cutting dies known in the art.

In general, kerfs have to be a little "tight", meaning for example, for a 0.028-inch thick rule, the corresponding kerf meant to receive the rule should be about 0.026" or 0.027" large, for a press-fitted/tight fit. This has the disadvantage that when the die expands, the rule may become loose creating instability, which is very undesirable. In contrast, should the die be made during winter time, the rule will have a tendency to "expand" during summer time (i.e. "outward pressure"), which would force the resulting die to expand as well, which would adversely affect the corresponding pattern to be respected by the die, which is also very undesirable, for obvious reasons. Therefore, traditional dies, and their corresponding components thereof, such as rules and corresponding kerfs intended to receive them, are highly sensitive to variations in temperature, humidity level, etc. Also, due to, the die has to be frequently re-knifed. The sheet production has to be stopped to be re-knifed by changing the rules.

Another drawback is associated with fact in that a die block and the rules must be stable and perfectly horizontally aligned once installed into the press to assure uniform cutting or bending over the all surface of the processed sheet. Traditional cutting dies have to be constantly levelled on press before starting the press for production. Here again, such leveling is time consuming and as the press needs to be frequently stopped.

Thus, it would be particularly useful to provide an improved system which, by virtue of its design and components, would be able to overcome or at least minimize some of the known drawbacks associated with conventional systems.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The aforesaid and other objectives of the present invention are realized by generally providing a die block for steel-rule cutting die and a steel-rule cutting die assembly comprising the same.

The invention is first directed to a die block comprising:

at least one kerf perpendicularly extending from an upper surface to a bottom surface of the die block, each kerf being configured to receive a corresponding steel-rule intended to be partially inserted into the kerf; and at least one element having magnetic properties and being located in proximity to each kerf for providing a magnetic field that retains the steel-rule when the steel-rule is received into the corresponding kerf.

According to a preferred embodiment, each kerf defines a kerf width and each corresponding rule has a rule thickness, the kerf width being equal or greater than the rule thickness.

According to a preferred embodiment, each kerf comprises at least two vertical facing walls extending from the upper to the bottom surface of the die block, and wherein the at least one magnetic element defines at least one flat surface parallel to one of the vertical facing wall of each kerf optionally forming a gap between the flat surface of each magnetic element and the wall's surface of each kerf. Preferably, the flat surface of each magnetic element is substantially aligned with the wall of each corresponding kerf to be in continuity with the kerf's wall.

According to a preferred embodiment, the die block further comprises: a plurality of spaced apart kerfs, extending from the upper to the bottom surface of the die block, along a longitudinal axis, each of the spaced apart kerfs being configured to receive a corresponding shaped steel-rule; and a channel extending from the upper to the bottom surface of the die block along the longitudinal axis, the channel being configured to receive and maintain into the die block a spacer plate comprising a ferromagnetic material. The at least one magnetic element magnetizes the spacer plate for magnetically interacting with each of the shaped steel-rules once inserted into the corresponding spaced apart kerfs. Preferably, each of the spaced apart kerfs may a V-shaped kerf having a first vertical face extending away from the longitudinal axis in a same direction than a subsequent V-shaped kerf, and a second vertical face parallely extending to the longitudinal axis and being adjacent to the channel.

According to a preferred embodiment, the at least one magnetic element is located in a recess extending from the kerf.

According to a preferred embodiment, the die block is a foam layer comprising said at least one kerf and said at least one magnetic element, the die block further comprising: a bottom plate configured to hold and support the foam layer, and comprising a plurality of grooves matching the at least one kerf of the foam layer for receiving a proximal end of the corresponding at least one steel-rule; and an opposite top plate comprising a plurality of grooves matching the at least one kerf of the foam layer for also receiving the corresponding at least one steel-rule with the knife of each steel-rule extending outwardly from the top plate. The bottom and top plates conceal the at least one magnetic element located into the foam layer. Preferably, the foam layer may comprise polyurethane, and the bottom plate and top plate may comprise a fiberglass material.

According to a preferred embodiment, each of the at least one magnetic element is a magnet. As described herein after, other magnetic elements could be considered without departing of the present invention.

The invention is also directed to a cutting die assembly for cutting and/or punching a material sheet using a press. The cutting die assembly comprises:

- at least one steel-rule defining a knife configured for cutting and/or punching the material;
- a die block configured to be inserted into the press and comprising at least one kerf perpendicularly extending from an upper surface to a bottom surface of the die block, each kerf being configured to receive the at least one steel-rule, the at least one steel-rule being partially inserted into the corresponding at least one kerf for outwardly exposing the knife of each steel-rule; and
- at least one element having magnetic properties and being located into the die block in proximity to each kerf for providing a magnetic field that retains the at least one steel-rule when the at least one steel-rule is received into the corresponding at least one kerf.

According to a preferred embodiment, each kerf of the assembly may define a kerf width and each corresponding rule has a rule thickness, the kerf width being equal or greater than the rule thickness.

According to a preferred embodiment, each kerf of the assembly may comprise at least two vertical facing walls extending from the upper to the bottom surface of the die block, and wherein the at least one magnetic element defines at least one flat surface parallel to one of the vertical facing walls of each kerf for optionally forming a gap between each flat surface of each magnetic element and each wall's surface of each kerf. Preferably, the flat surface of each magnetic element is substantially aligned with the wall of each corresponding kerf to be in continuity with the kerf's wall.

According to a preferred embodiment, the cutting die assembly may further comprises: a plurality of spaced apart kerfs, extending from the upper to the bottom surface of the die block, along a longitudinal axis, each of the spaced apart kerfs being configured to receive a corresponding shaped steel-rule; a channel extending from the upper to the bottom surface of the die block along the longitudinal axis; and a spacer plate comprising a ferromagnetic material and inserted into the channel configured to receive and maintain said spacer into the die block. The at least one magnetic element magnetizes the spacer plate for magnetically interacting with each of the shaped steel-rules once inserted into the corresponding spaced apart kerfs. Preferably, each of the spaced apart kerfs is a V-shaped kerf having a first vertical face extending away from the longitudinal axis in a same direction than a subsequent V-shaped kerf, and a second vertical face parallely extending to the longitudinal axis and being adjacent to the channel.

According to a preferred embodiment, the at least one magnetic element of the cutting die assembly is located in a recess extending from the kerf.

According to a preferred embodiment, the die block of the cutting die assembly is a foam layer comprising said at least one kerf and said at least one magnetic element, The cutting die assembly further comprises: a bottom plate configured to hold and support the foam layer, and comprising a plurality of grooves matching the at least one kerf of the foam layer for receiving a proximal end of the corresponding at least one steel-rule; and a top plate opposite to the bottom plate comprising a plurality of grooves matching the at least one kerf of the foam layer for also receiving the corresponding at least one steel-rule with the knife of each steel-rule extending outwardly from the top plate. The bottom and top plates conceal the at least one magnetic element located into the foam layer. Preferably, the foam layer comprises polyurethane, and the top and bottom plates comprise a fiberglass composite material. Other light resisting foam and composite materials known in the art can be used without departing from the instant invention.

According to a preferred embodiment, the at least one magnetic element of the cutting die assembly may be a magnet.

The invention is further directed to a method for providing stability and alignment of a die block intended to be used in collaboration with a press for cutting and/or punching a sheet of material, the method comprising the steps of:

- partially inserting a steel-rule into a corresponding kerf of the die block for outwardly exposing a knife of the steel-rule configured to cut and/or punch the sheet; and
- magnetizing the steel-rule once inserted into the kerf of the die block.

The invention is yet further directed to a method for manufacturing a stabilized die block intended to be used in collaboration with a press for cutting and/or punching a sheet of material, the method comprising:

- providing a die block with at least one kerf;
- and for each kerf:
- positioning at least one magnetic element in proximity to the kerf for providing a magnetic field; and
- partially inserting at least one steel-rule into the kerf for retaining the at least one steel-rule into the kerf while exposing a knife of the steel-rule outwardly projecting from the die block; the magnetic field stabilising and aligning each steel-rule once inserted into the kerf.

The magnetic device(s) located in proximity to the kerf(s) may allow maintaining the corresponding rule(s) in position within its kerf even if the kerf is cut "loosely", that is to say with a corresponding kerf having a certain margin, so that the corresponding rule may be quickly and easily inserted and accurately maintained even if the die block expand or retract under atmospheric variations.

Other advantages will be described herein after.

BRIEF DESCRIPTION OF THE DRAWINGS

The above and other objects, features and advantages of the invention will become more readily apparent from the following description, reference being made to the accompanying drawings in which.

DETAILED DESCRIPTION OF THE PREFERRED EMBODIMENT

Figure 1:
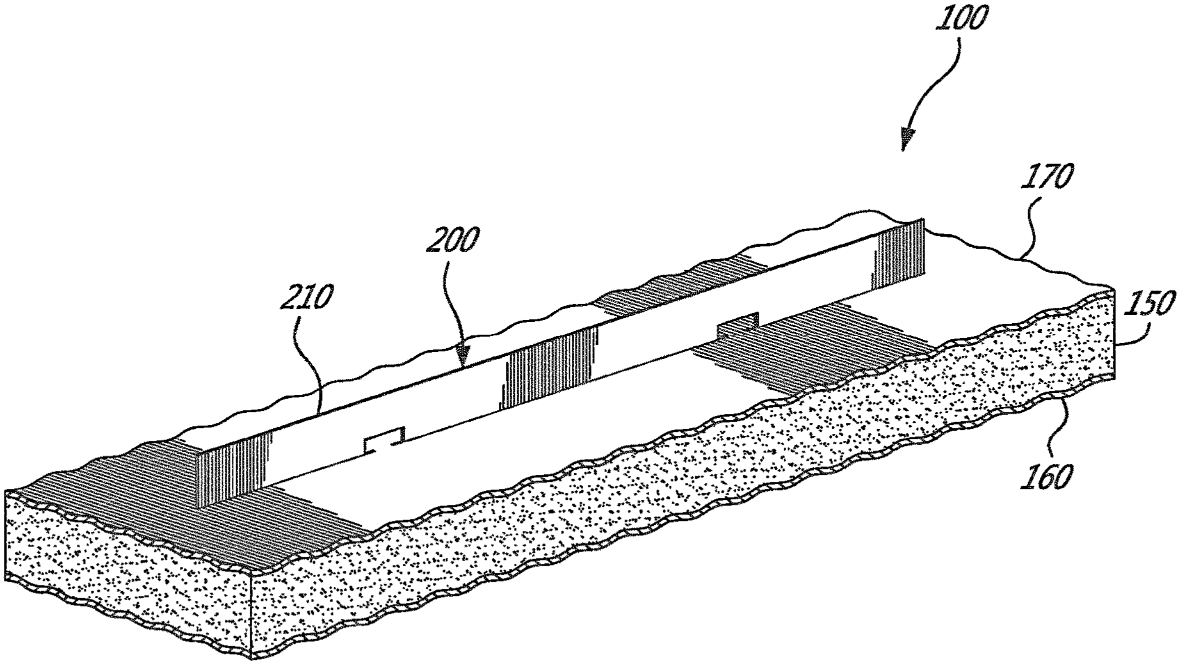
FIG. 1 is an illustration of a portion of a die block in accordance of a preferred embodiment.
Figure 2:
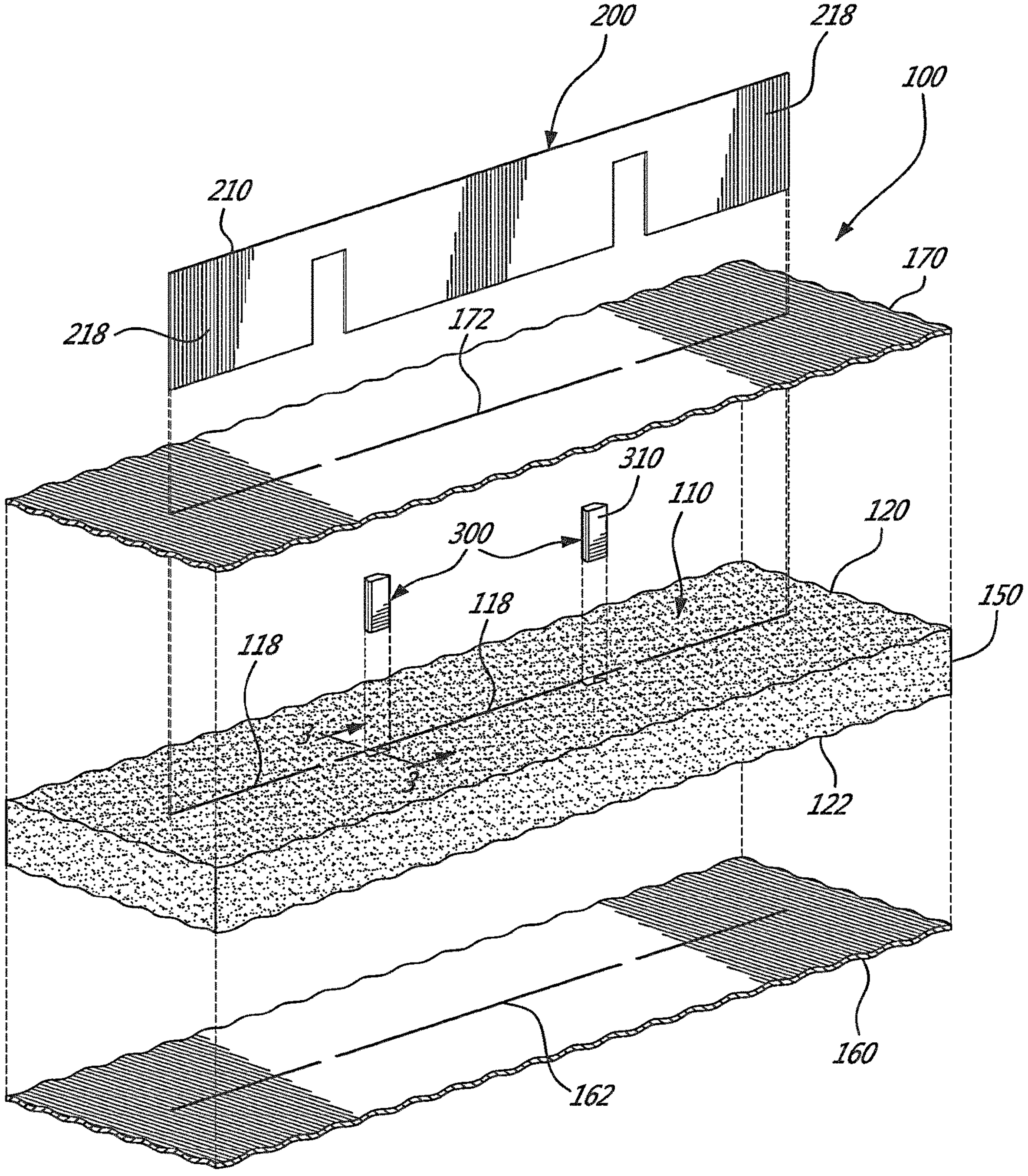
FIG. 2 is a exploded view of the portion of the die block illustrated on FIG. 1.

Preferred embodiments of steel-rule cutting die assembly for cutting and/or shaping sheet metal and softer materials, such as plastics, wood, cork, felt, fabrics, and paperboard are now described. Although the invention is described in terms of specific illustrative embodiment(s), it is to be understood that the embodiment(s) described herein are by way of examples only and that the scope of the invention is not intended to be limited thereby.

Definitions

By the term "about" used in the instant application, it is meant that the value or data associated with this term (such as a length, weight, temperature, etc.) can vary within a certain range depending on the margin of error of the method or device used to evaluate or measure such value or data. A margin or variation of up to 10% is typically accepted to be encompassed by the term "about".

"Die block" refers to the main part of the die that all the other parts are attached to.

"Steel-rule", also named "rule", is a hard steel strip of the cutting die. The rule may be in one longitudinal or curved section, or comprise several longitudinal and/or curved sections to provide customized cut or punching to the sheet.

The "knife" is the cutting or punching edge of the steel rules that can be sharp for cutting or soft for punching or bending the sheet.

The "kerf" is a longitudinal aperture or groove made with a saw or laser-cut in wooden, plywood, foam or plastic board or block to position the rules into the board or block.

Presses for cutting and or shaping sheet material such as paper, paperboard, cardboard and the like, are well known. Sheet material is typically pre-cut, and often includes pre-cut portions, which need to be stripped out using stripping stations and/or devices. Examples of mechanical devices for stripping waste from a pre-cut sheet of material are described in Applicant's U.S. Pat. No. 7,360,475 (Quercia), or international patent application no. WO 2016/145534 A1 (Quercia), the contents of which are incorporated herein by reference.

REFERENCE NUMBERS IN THE DRAWINGS

100 Die block;
110 Kerf(s);
112 kerf's width;
114, 116 kerf's facing vertical walls;
115 opposite ends of the kerf;
118 subsections of the kerf(s);
120, 122 upper and bottom surface of the die block;
124 edge of a die block;
130 Small or V-shaped kerf(s);
132 first face of a small or V-shaped kerf;
134 second face of a small or V-shaped kerf;
140 recesses or entrapping volumes;
150 foam layer;
160 bottom plate;
162 groove(s) of the bottom plate;
170 top plate;
172 groove(s) of the top plate;
180 channel for magnetizing plate;
200 steel-rule or rule;
210 knife of the rule (that can be sharp, or crease/score);
218 sub-sections of the rule(s);
220 steel-rule's thickness;
222 distal lateral ends of the kerf;
230 small or V-shaped rules;
232 first face of a small or V-shaped rule;
234 second face of a small or V-shaped rule;
300 magnetic element(s);
310 magnetic element's flat face;
320 gap; and
330 magnetized plate;
400 cutting-die assembly; and
500-900 steps of the methods.

FIG. 1 to 5 illustrate portions of a die block 100 in accordance with a first embodiment. A die block 100 typically comprises at least one kerf 110 perpendicularly extending from an upper surface 120 to a bottom surface 122 of the die block 100. Each kerf is configured to receive a corresponding steel-rule 200 intended to be partially inserted into the kerf as shown on FIG. 1. The section of the rule 200 that outwardly extends from the upper surface 120 of the block 100 has a distal edge known as the knife 210 for cutting, if the knife is sharp, or punching the sheet, if the knife is soft.

Figure 13:
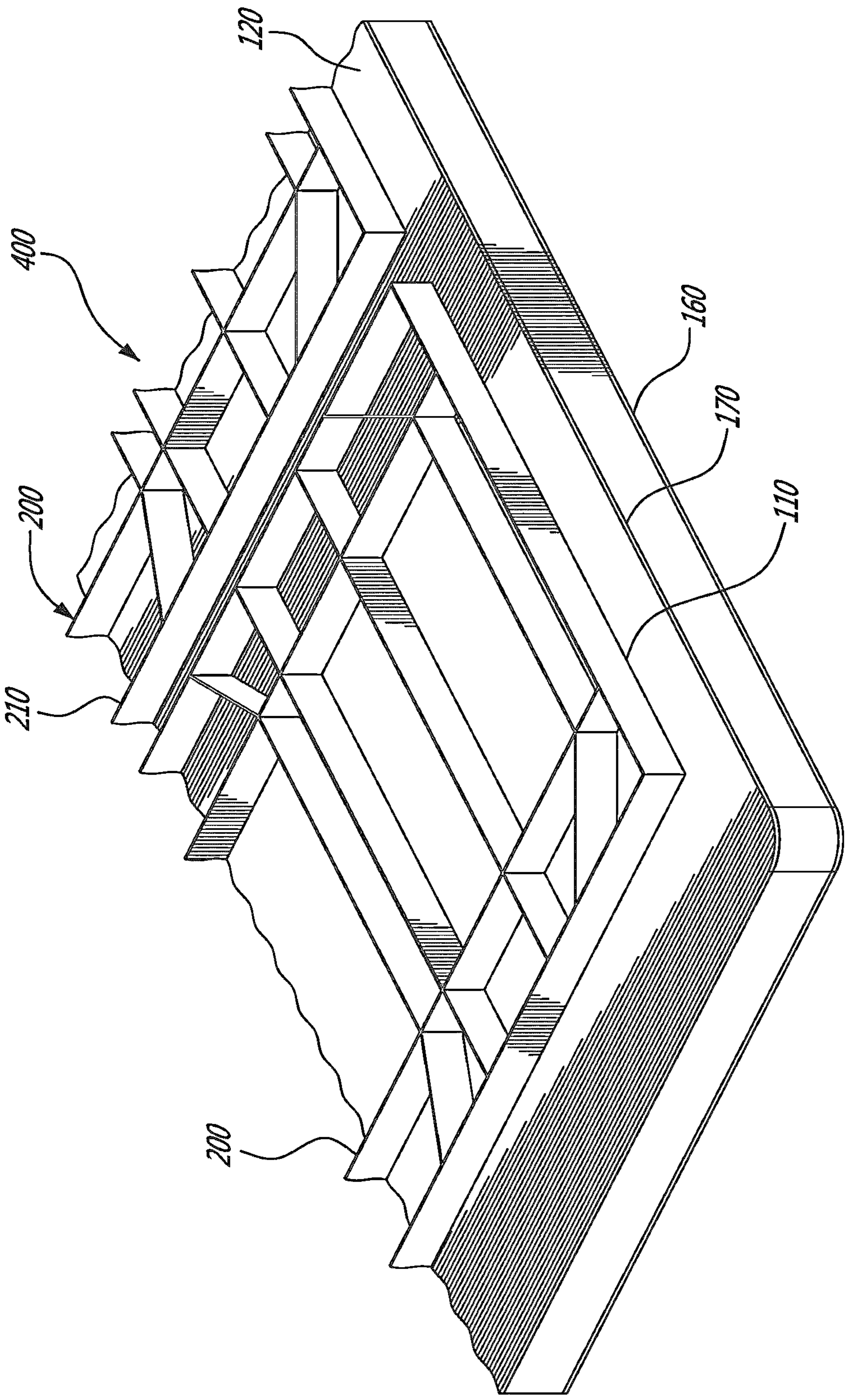
FIG. 13 is a top perspective view of a steel-rule cutting die assembly according to a preferred embodiment.

As partially illustrated on FIG. 13, a die block will generally comprise a plurality of rules 200 and corresponding kerfs 110 forming a more or less complex design or pattern for producing different customized material sheets.

The making of a packaging box is an example in which a sheet of paperboard or carton will be cut and punched to form different sections that will be afterwards bent and glued to form the box. To access inside the box, at least one of its faces will need to have pre-defined cuts to allow an easy opening of the box and also to close the box between after opening. Accordingly, the die box is engineered to comprise both sharp and soft knifes 210 for producing the required box after bending and gluing.

From the above example, one may understand that a die block has to be horizontal when installed into the press with all the rules horizontally aligned over the entire surface of the die block to evenly process each sheet entering the press. A variation of the horizontality of the die block and/or of the alignment of the rules will make the processed sheet improper to use and the press will have to be stopped for leveling the die block and rules.

The die block 100 disclosed here allows avoiding that the expansion/contraction of the block under atmospheric variations affects the rules alignment. To do so, the die block also comprises at least one magnetic element 300 located in proximity to each kerf 110 for providing a magnetic field that retains the steel-rule 200 when the steel-rule is received into the corresponding kerf. Although the magnetic element described in the drawings is a magnet, other options may considered without departing from the scope of then present invention, such as electro-magnetic systems.

Figure 3:
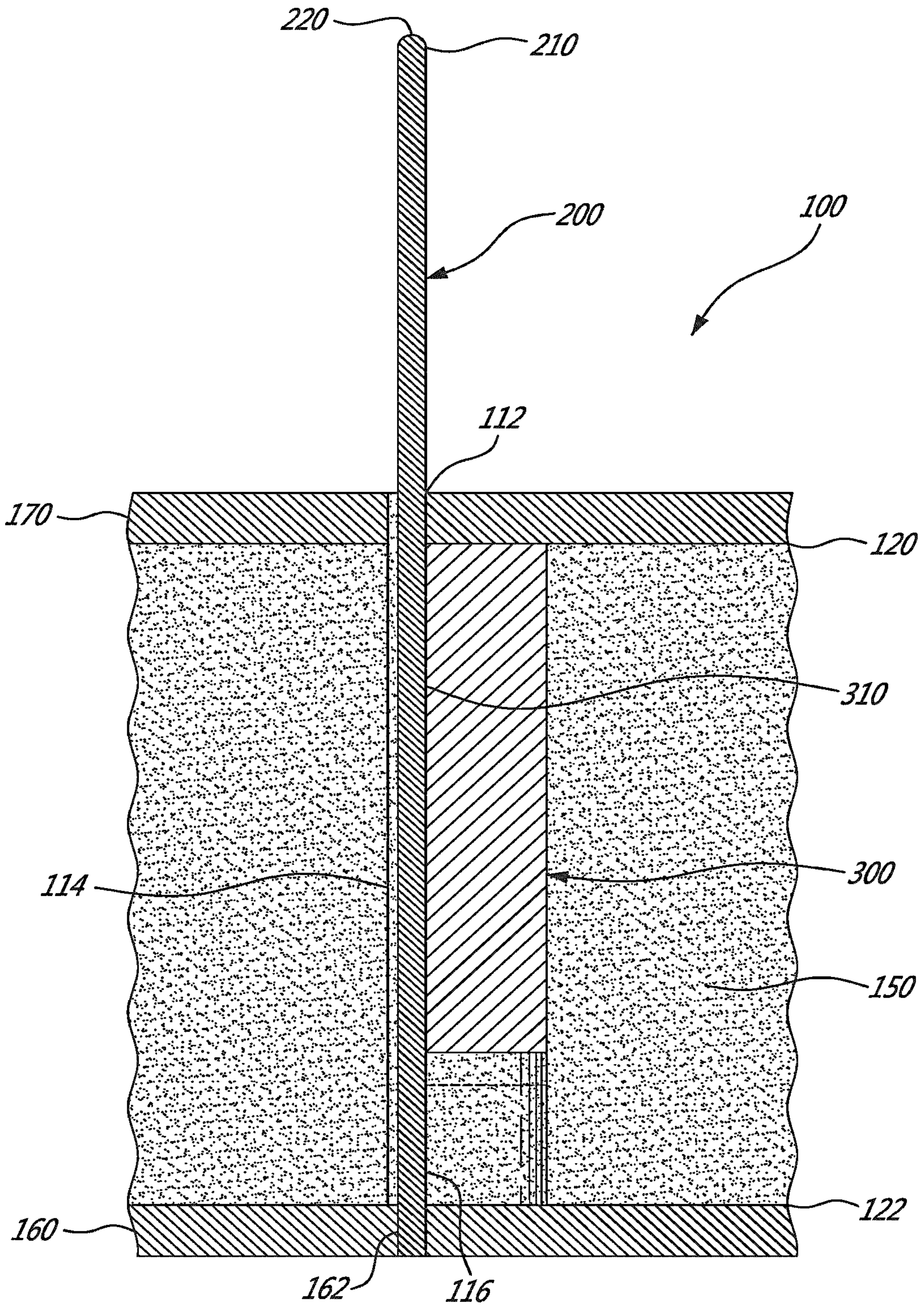
FIG. 3 is a cross-section view along the line 3-3 on the portion of the die block illustrated on FIG. 2, according to one embodiment.

According to a preferred embodiment, such as the one illustrated on FIG. 3, each kerf 110 defines a kerf width 112 and each corresponding rule has a rule thickness 220. Preferably, the presence of one or more magnetic elements 300 along the kerf 110 stabilizes the rule 200 inserted into the block 100, allowing the kerf to have its width 112 at least equals to the rule's thickness 220 as illustrated on FIG. 4, or the kerf's width 112 slightly greater than the rule's thickness 220 as illustrated on FIG. 3. This new configuration of the die block will diminish the influence of die block expansion due to the variations of the atmospheric conditions (temperature, humidity, pressure) on the rule's alignment.

Figure 4:
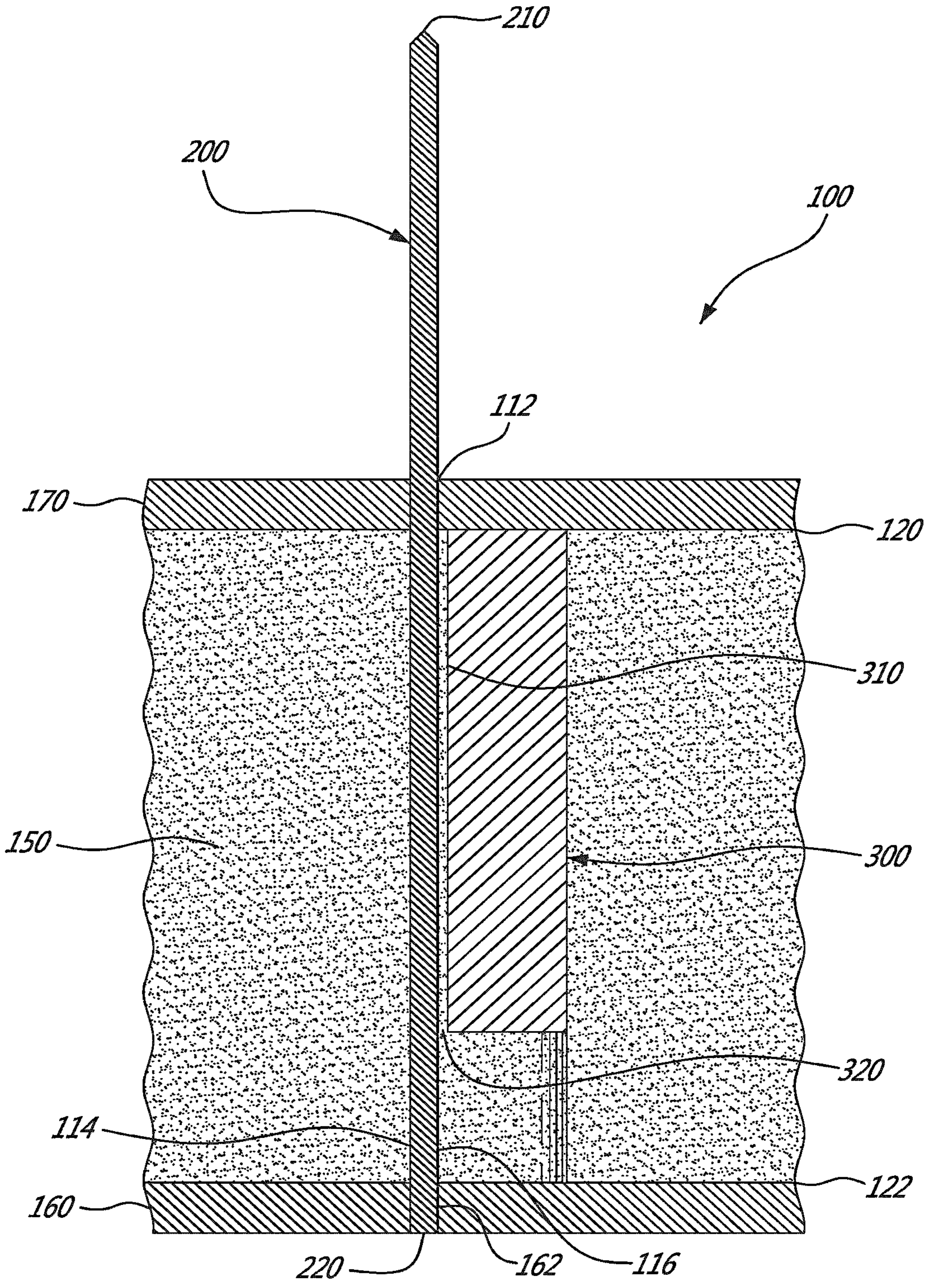
FIG. 4 is a cross-section view of a portion of a die block according to another embodiment.
Figure 5A:
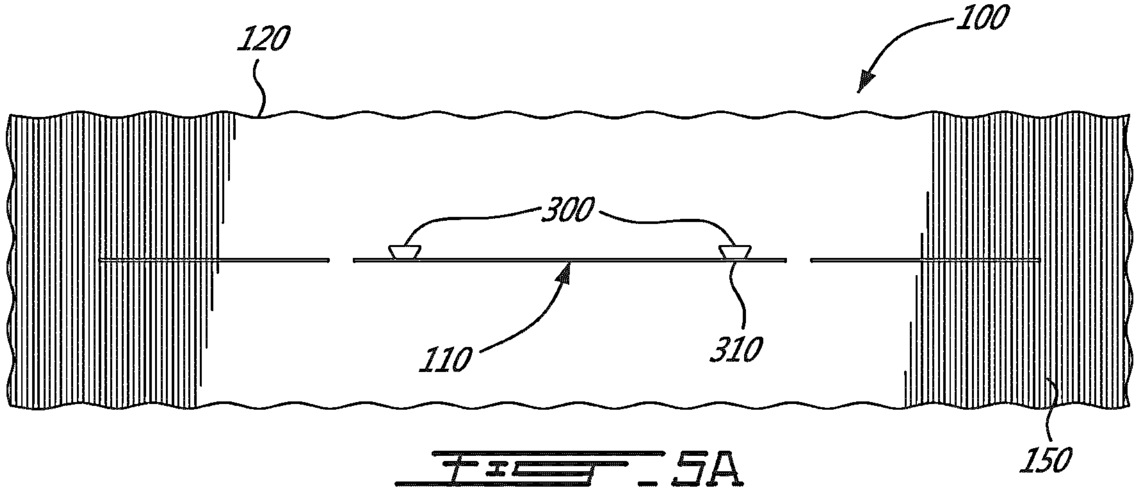
FIGS. 5A-5C illustrate examples of positions of the magnetic elements along a kerf according to different embodiments.
Figure 5B:
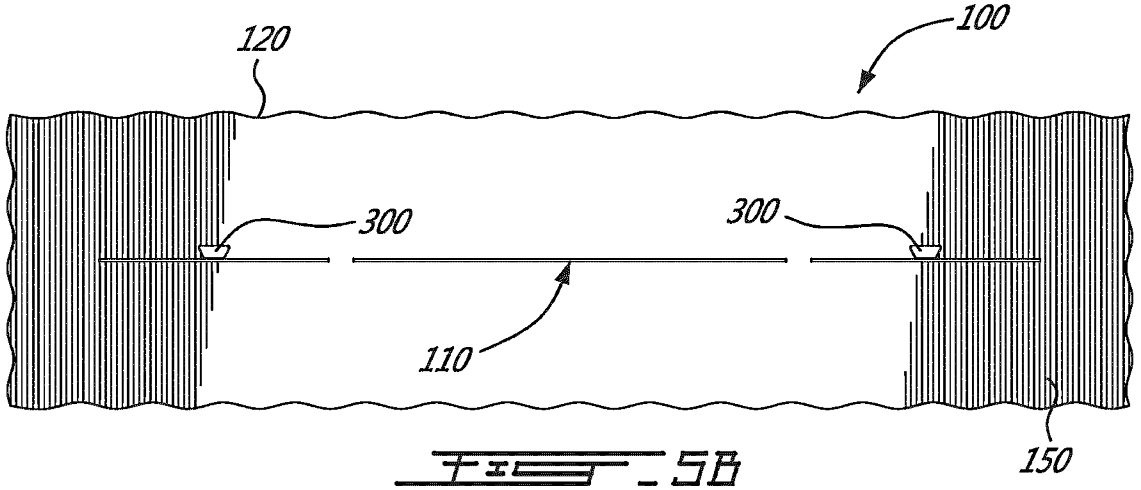
Figure 5C:
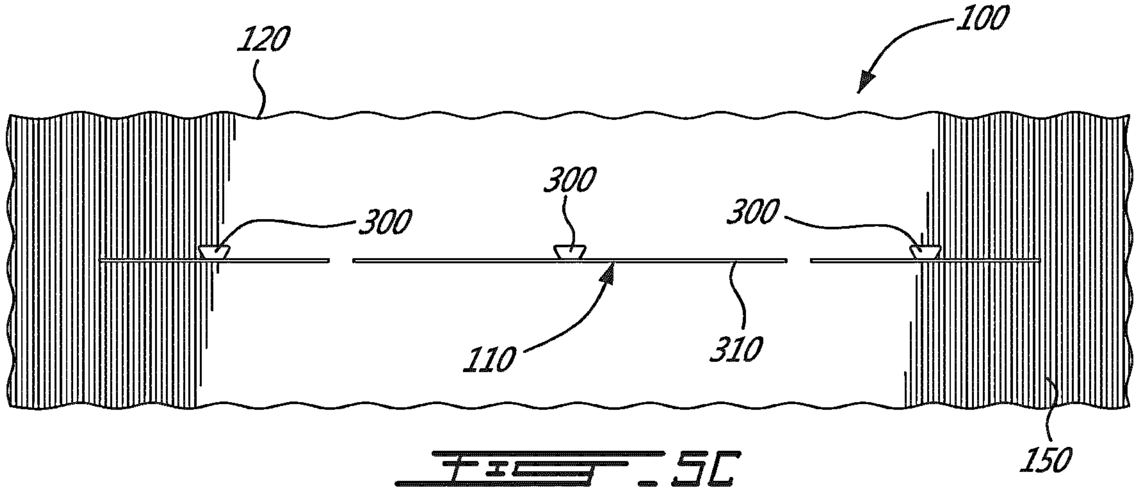

As illustrated on FIG. 3 or 4, each kerf 110 generally comprises at least two vertical facing walls 114, 116 extending from the upper 120 to the bottom 122 surface of the die block 100. The magnetic element 300 adjacent to one of the kerfs walls 116 defines at least one flat surface 310 parallel to one of the vertical kerfs walls.

As illustrated on FIG. 2 and FIGS. 5A-5C, each kerf 110 may have several sub-sections 118 for one rule 200 presenting corresponding sub-sections 218 to be inserted into the kerf 110. The die block 100 may have several magnetic elements 300 disposed along the kerf and be located according to different position (see FIGS. 5A-5C). The number and position of each magnetic element will be selected in accordance with the size, shape and weight of each rule.

As illustrated in FIG. 3 and FIGS. 5A-5C, the flat surface 310 of each magnetic element may substantially aligned with the wall of each corresponding kerf to be in continuity with the kerf's wall. The steel-rule 200 once inserted into the kerf is preferably not directly in contact with the magnetic element 300 while being very close. A distance or gap of between about 0.01 mm and 0.20 mm, more preferably of about 0.05 mm (or 0.02") between the magnetic element and the rule's surface is acceptable.

Figure 6A:
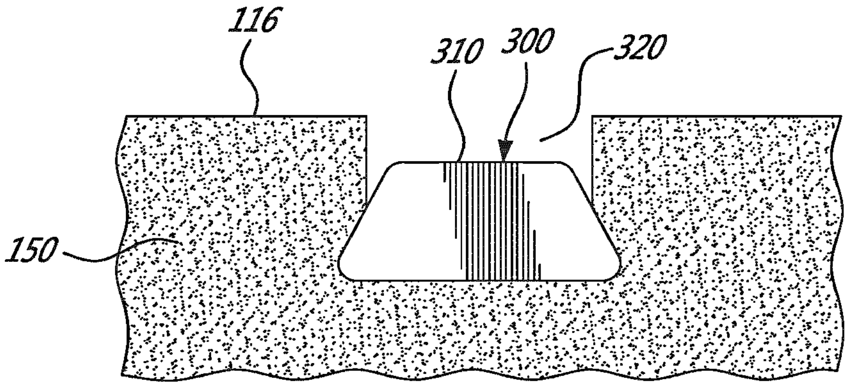
FIGS. 6A to 6C are plan top views of one magnetic element concealed into the die block along a kerf according to different embodiments.
Figure 6B:
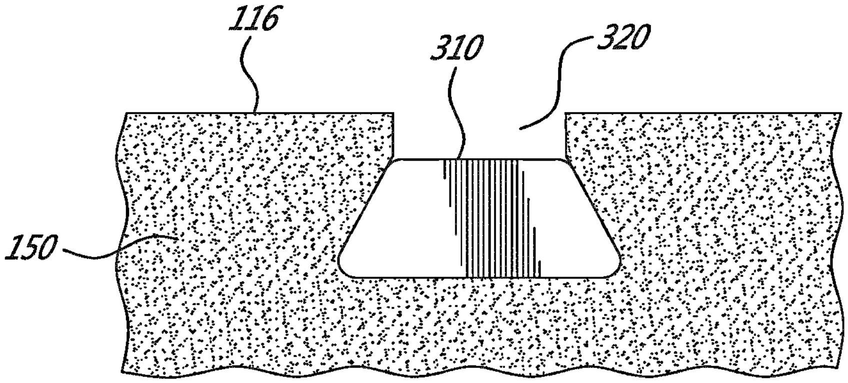
Figure 6C:
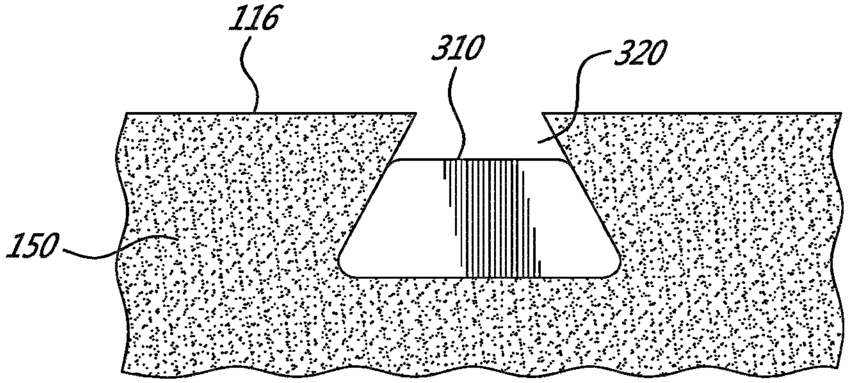
Figure 7A:
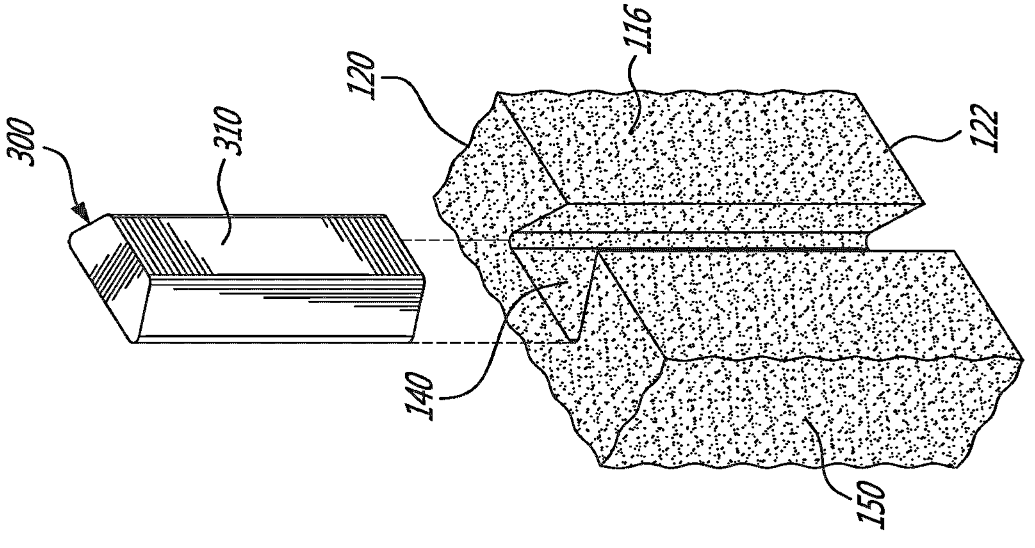
FIG. 7A-7C are exploded perspective views of the different embodiments illustrated on FIGS. 6A to 6C, respectively.
Figure 7B:
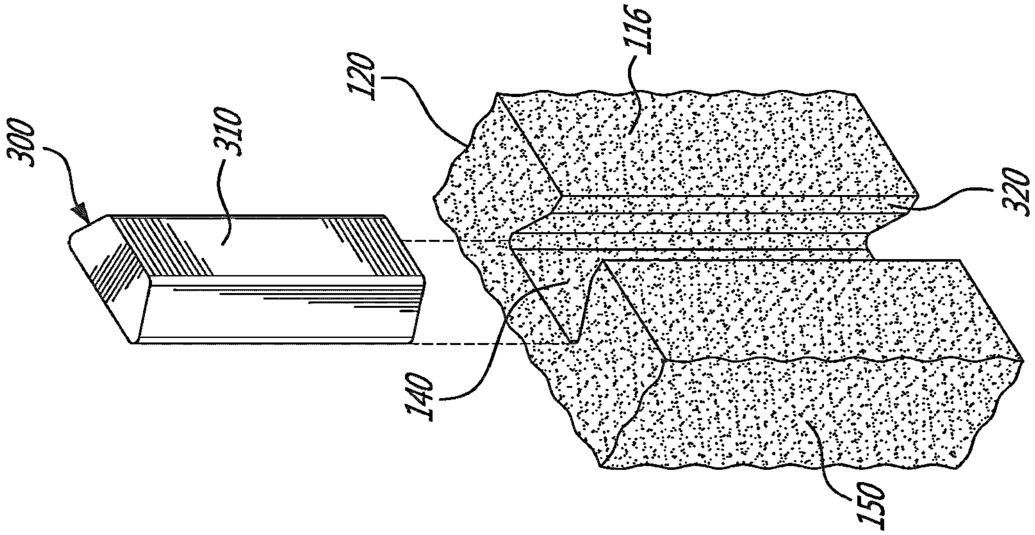
Figure 7C:
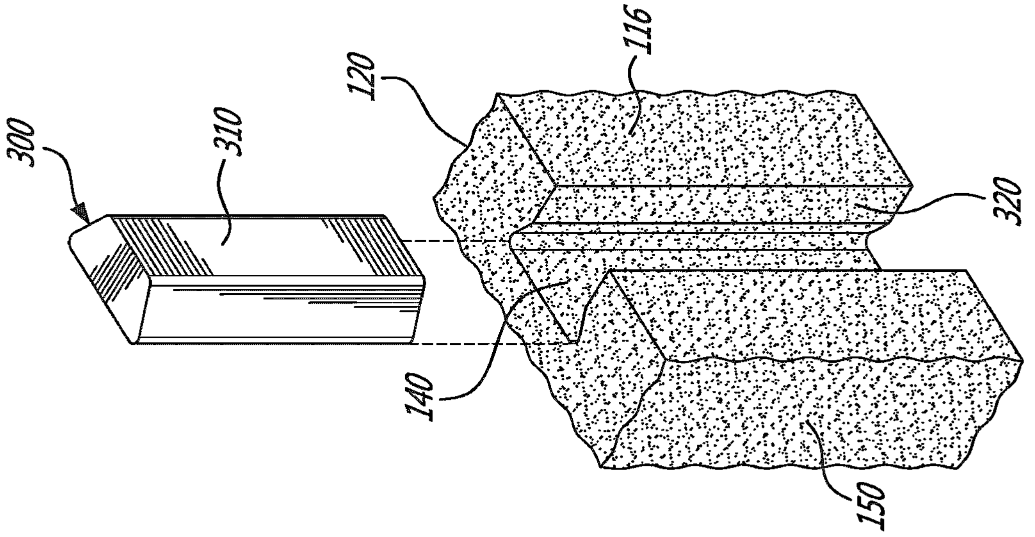
Figure 8:
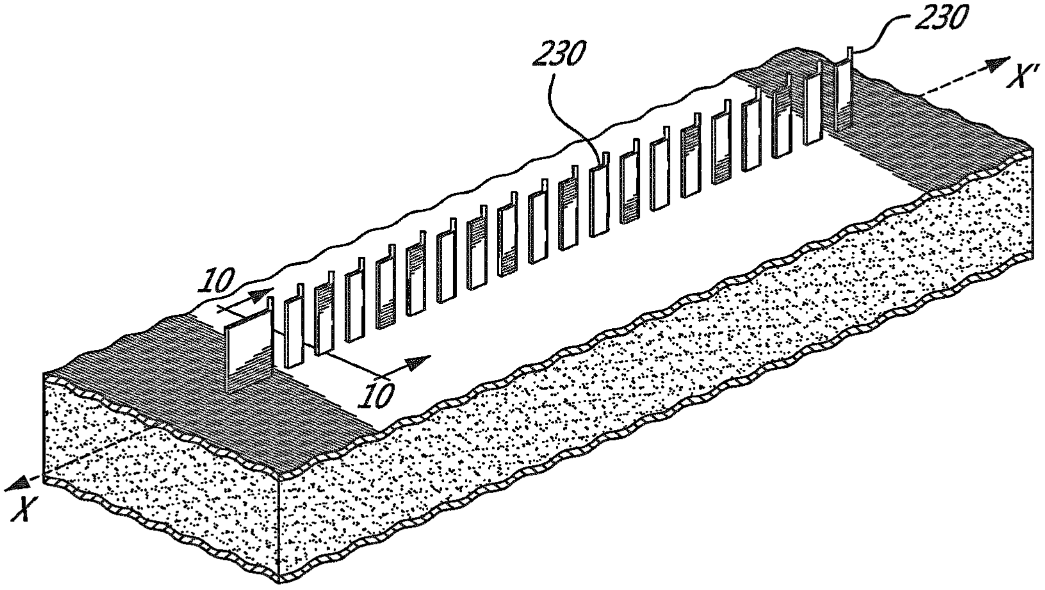
FIG. 8 is an illustration of a portion of a die block in accordance of another preferred embodiment.

As illustrated in FIG. 4, the magnetic elements may also be kept apart from the rule 200 by concealing the magnetic element 300 into the die block 100 to form a gap 320 between the flat surface 310 of each magnetic element 300 and the wall's surface 116 of each kerf 110. As aforesaid, the gap 320 may be between about 0.01 mm and 0.20 mm, more preferably the gap is about 0.05 mm (or 0.02"). FIGS. 6A-6C and corresponding FIGS. 7A-7C illustrate three examples of possible configurations for concealing a magnetic element 300 having a longitudinal trapezoid shape with the smaller face 310 adjacent to the kerf. This specific form of the magnetic element can be easily retained into the die block using different options of embedding or entrapping volumes 330 (FIGS. 6A-6C and FIGS. 7A-7C) for entrapping/embedding each magnetic element 300 and maintaining it slightly apart from the kerf 110 and the corresponding rule 200. Other shapes for the magnetic elements and corresponding insert or entrapping volumes 140 can be considered without departing from the scope of the present invention.

The Figures illustrate magnetic elements that are not extending all along the entire thickness of the die block 100. Other configurations can be considered without departing from the scope of the present invention, for instance with a magnetic element that would extend from the upper 120 to the bottom 122 surface of the die block 100.

As illustrated on the Figures, the die block 100 may comprise a foam layer 150 in which the kerfs have been cut together with the entrapping volumes 140 of the magnetic elements. The die block 100 may further comprising a bottom plate 160 configured to hold and support the foam layer 150 and an opposite top plate 170 comprising a plurality of grooves 172 matching the kerf(s) of the foam layer 150 for also receiving the corresponding steel-rule(s) with the knife of each steel-rule extending outwardly from the top plate 170. The bottom plate 160 and the top plate 170 conceal the magnetic element(s) located into the foam layer 150. Preferably, the foam layer may be made of a rigid foam block comprising for instance polyurethane, and the bottom plate and top plate may comprise a hard plastic material.

Figure 11:
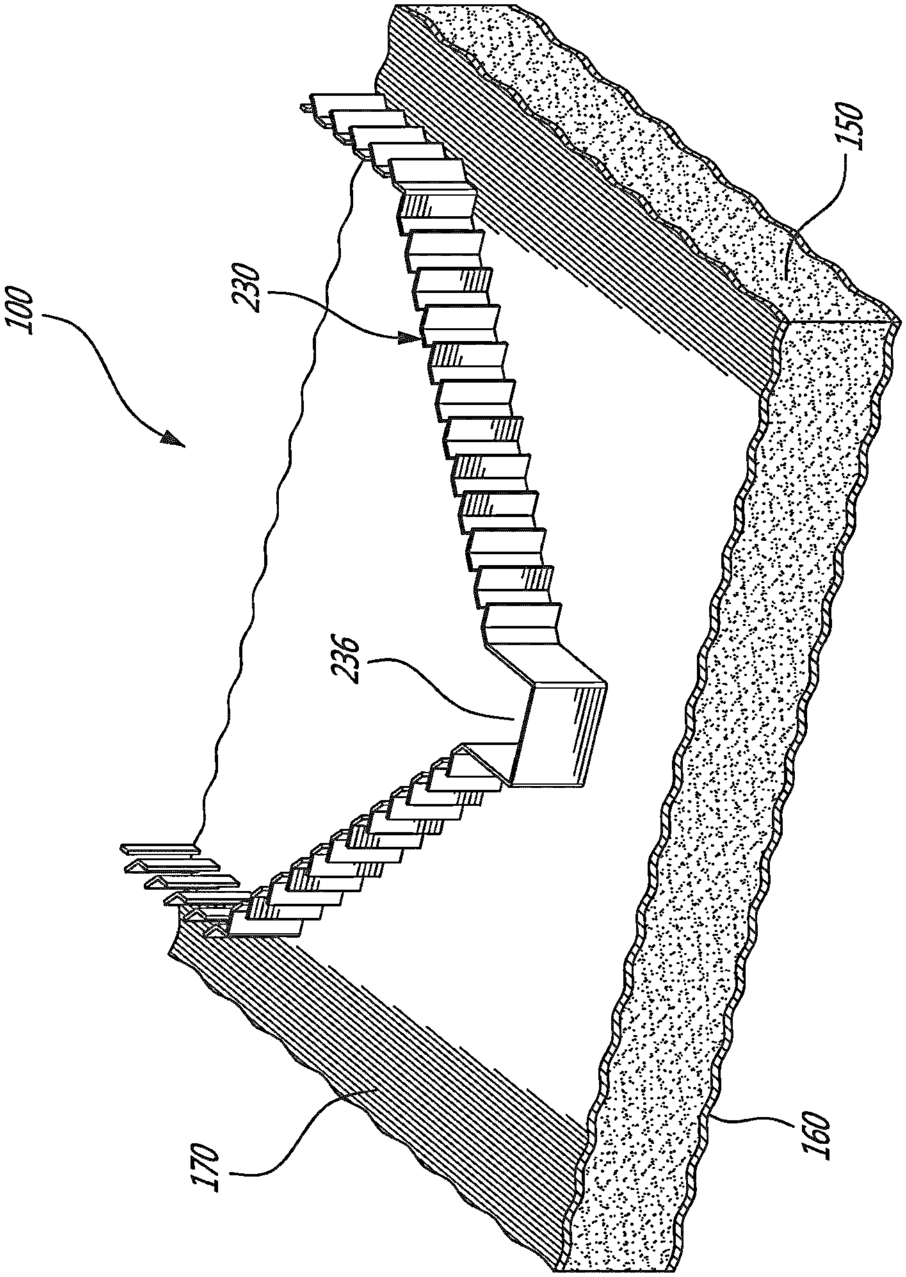
FIG. 11 is an illustration of a portion of a die block in accordance with another preferred embodiment.

Referring to the example of the making of a packaging box mentioned herein before, one may understand that a die block may further comprise specific steel-rule/kerf arrangements for instance for producing specific cuts allowing the opening of the box (see FIG. 11 illustrating an arrangement for producing a large V-shaped opening generally located on the top a box).

An example of such specific arrangement is illustrated on FIGS. 8 to 11. It is understood that one die block may comprises a plurality of different arrangements in accordance with the final design of the punched/cut sheet.

The die block 100 comprises a plurality of spaced apart kerfs 130 extending from the upper 120 to the bottom surface 122 of the die block 100, along a longitudinal axis (X-X'). Each of the spaced apart kerfs 130 is configured to receive a corresponding shaped steel-rule 230. The die block also comprises a channel 180 extending from the upper 120 to the bottom 122 surface of the die block 100 along the longitudinal axis (X-X'). The channel 180 is configured to receive and maintain into the die block 100 a spacer plate 330 comprising a ferromagnetic material. The magnetic element 300 magnetizes the spacer plate 330 allowing the magnetized plate to magnetically interact with each of the steel-rule plates 230 in the spaced apart corresponding kerfs 130. In other words, the presence of the magnetized plate along the axis X-X' formed by the kerfs allows using a smaller number of magnetic elements 300 along the same axis while interacting with all the rules 230 present along the magnetized plate 330.

As illustrated in the Figures, the spaced apart kerfs 130 may have a V-shape defining a first vertical face 132 extending away from the longitudinal axis in a same direction than a subsequent V-shaped kerf, and a second vertical face 134 parallely extending to the longitudinal axis and being adjacent to the channel 180.

Figure 9:
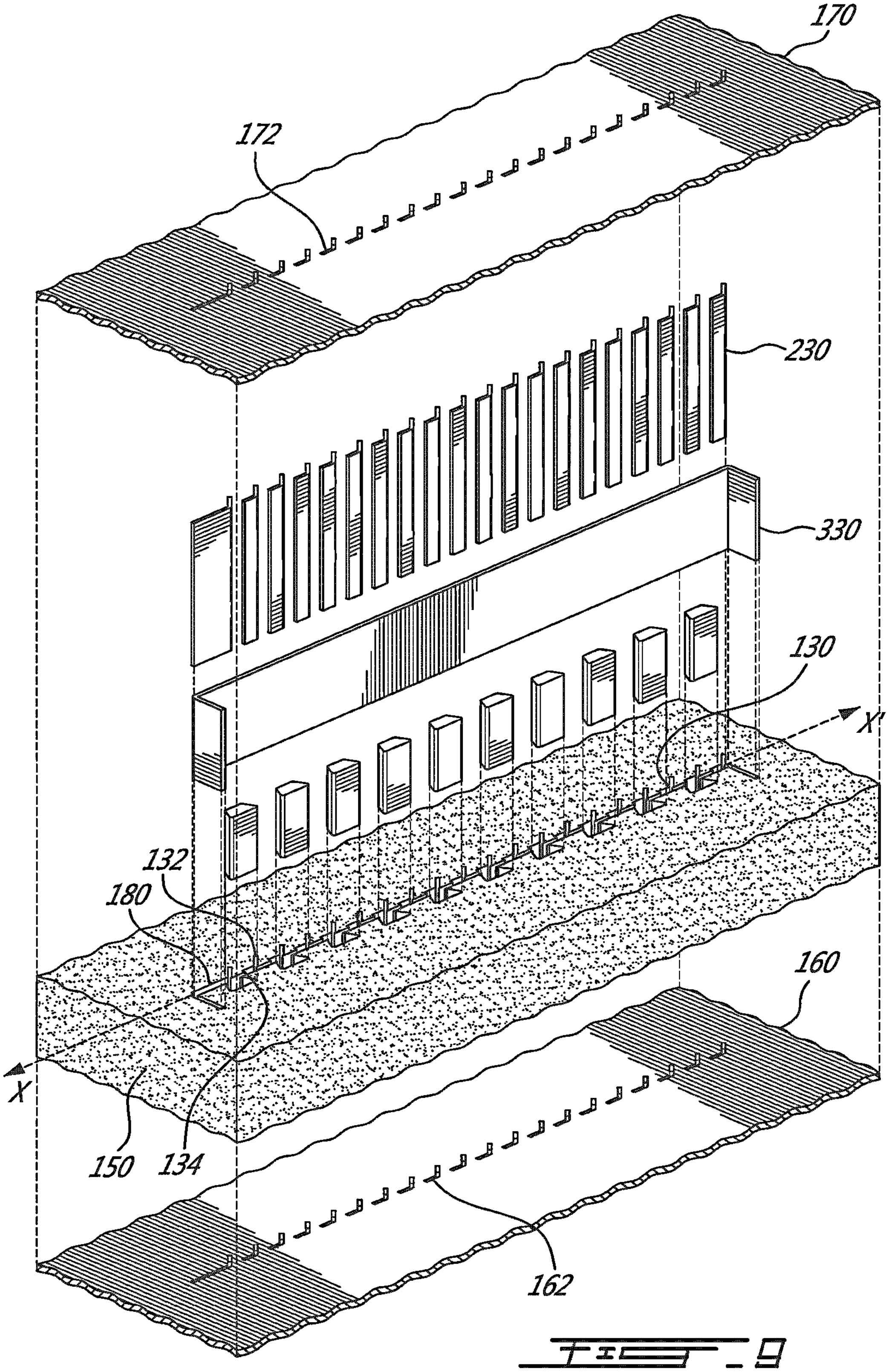
FIG. 9 is a exploded view of the portion of the die block illustrated on FIG. 8.
Figure 10:
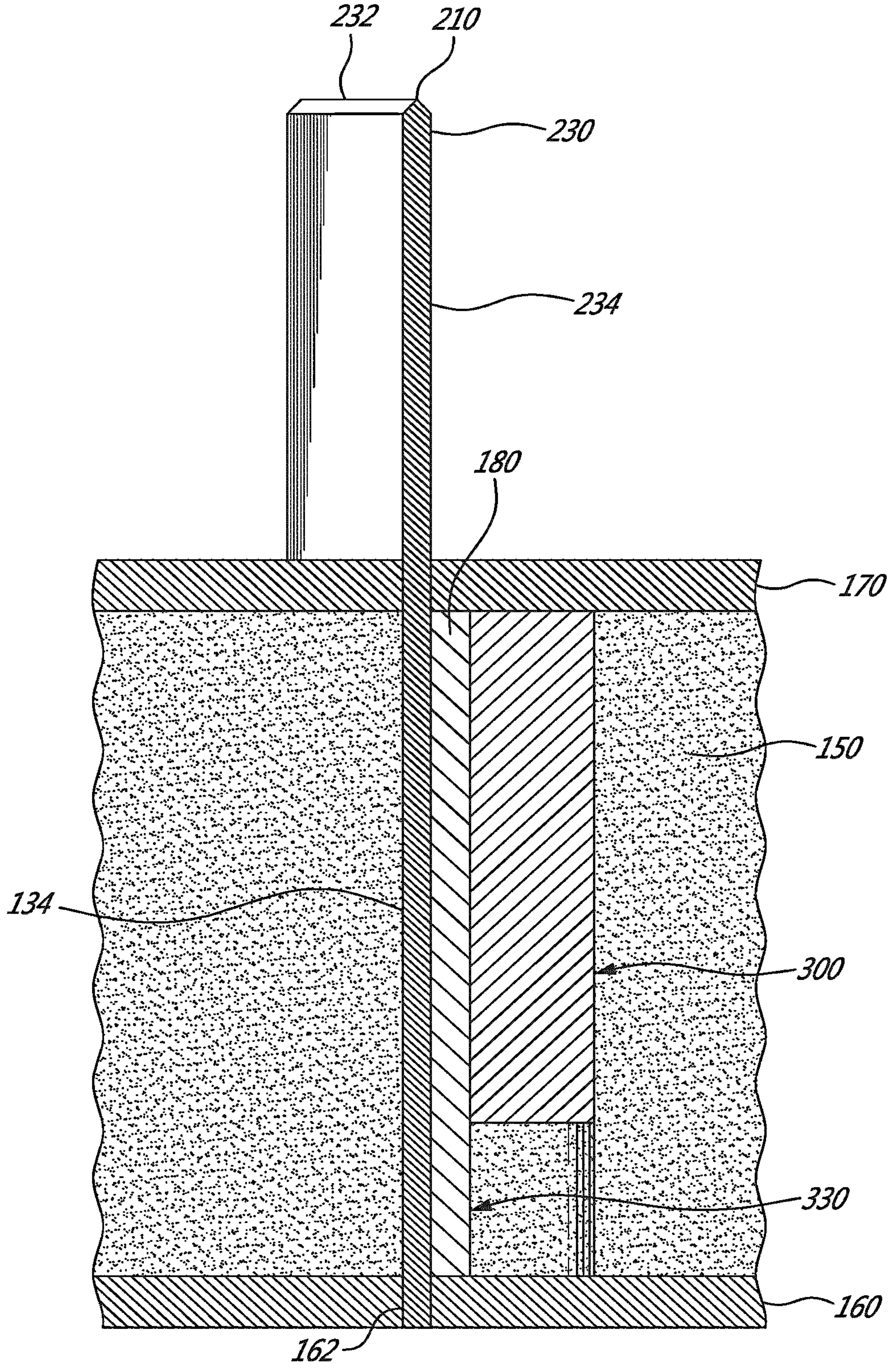
FIG. 10 is a cross-section along the line 10-10 on the portion of the die block illustrated on FIG. 8.

As described herein before, each magnetic element 300 may be located into a recess or entrapping volume 140 extending from the kerf 110 when no magnetizing plate is used, or extending from the channel 180 when a magnetizing plate is used as illustrated on FIGS. 9 and 10. Each of the at least one magnetic element may be a magnet or other magnetic or electro-magnetic elements known in the art.

Figure 12A:
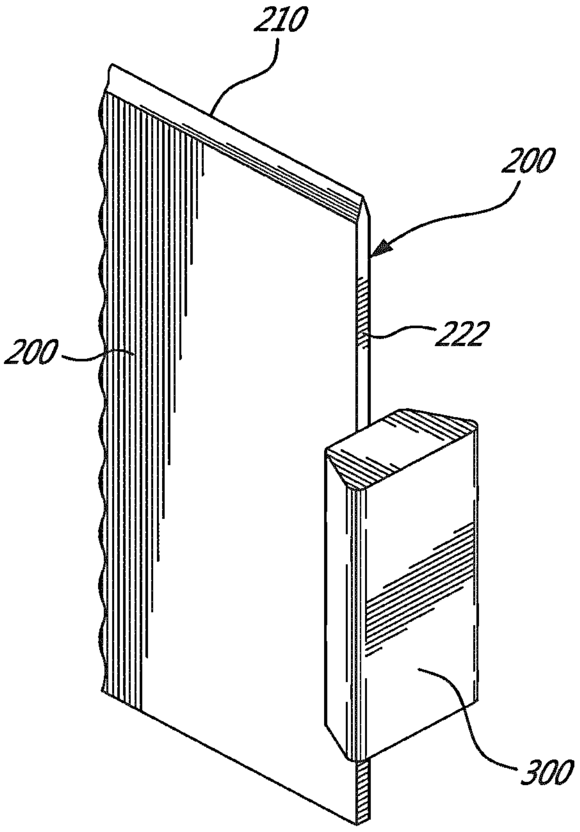
FIGS. 12A, 12B and 12C illustrate other positions of a magnetic element in accordance of another preferred embodiment.
Figure 12B:
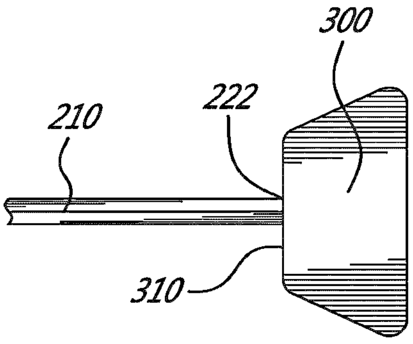
Figure 12C:
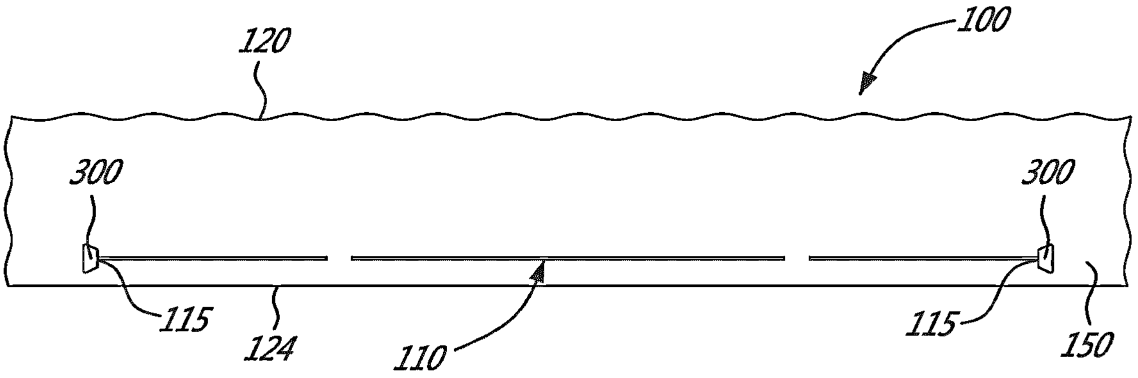

FIG. 11 illustrates an arrangement for producing a large V-shaped opening, generally located on the top a box. This arrangement comprises two converging axes of spaced-apart V-spaced rules as detailed above and a U-shaped rule 236 located at the converging point of two axes. The U-shaped rule 236 will form a cut in the sheet of material that will be used in collaboration with the cuts formed by the converging V-shaped rules to manually strip off the V-shaped opening and open the box. It has to be understood that other kerf/rule arrangement can be designed without departing from the scope of the invention As illustrated on FIGS. 12A-12C, the magnetic element 300 may also be located at the opposite ends 115 of the kerf 110 for facing the distal lateral ends 222 of the rule 200. As better shown on FIG. 2C, this location of the magnetic elements 300 is particularly convenient when, for instance, the kerf 110 is closely extending along the periphery or edge 124 of the die block 100. As such, there is not enough space between the kerf 110 and the edge 124 to nest a magnetic element 300 there between. As better shown on FIG. 2A or 12 B, the flat surface 310 of the magnetic elements 300 may be optionally in contact with the distal end 222 of the rule 200.

As illustrated in FIG. 13, also in reference with the description of FIGS. 1-12 detailed above, the invention is also directed to a cutting die assembly 400 for cutting and/or punching a material sheet using a press. The cutting die assembly 400 may comprise:

- at least one steel-rule 200 defining a knife 210 configured for cutting and/or punching the material;
- a die block 100 configured to be inserted into the press (not illustrated) and comprising at least one kerf 110 perpendicularly extending from an upper surface 120 to a bottom surface 122 of the die block 100, each kerf 110 being configured to receive the at least one steel-rule 200, the at least one steel-rule 200 being partially inserted into the corresponding at least one kerf 110 for outwardly exposing the knife of each steel-rule; and
- at least one magnetic element 300 located into the die block 100 in proximity to each kerf 110 for providing a magnetic field that retains the at least one steel-rule when the at least one steel-rule is received into the corresponding at least one kerf.

The cutting die assembly may contain all the other elements as described herein before for the die block, and additional elements known in the art for the manufacturing of cutting-dies.

Examples of Material that can be Used for the Manufacturing of the Die Block and the Cutting-Die Assembly:

Magnets: The force of a magnet is commonly defined by a number. Higher the number is, stronger is the magnet. However, the higher the number is, more brittle the magnet becomes. The most common grades of Neodymium (Rare earth) magnets are N35, N38, N40, N42, N45, N48, N50, N52, and N55. Any one of these strengths can be used. More preferably, N52 magnets are used.

Foam: Although any non-porous stable material can be used for this application, preferably the applicant uses a light weight 301*b* low density polyurethane board that also provides optimal dimensional stability and is used for the core (the foam layer) of the die.

Top & bottom plates: There are many materials that can be used for the top and bottom plates. Preferably, a high-pressure fiberglass laminate G10 is used. Such a resin-based laminate is strong, extremely stable, and is very well cut with a laser.

Rules: The body of the cutting rule usually has a hardness of about 35-40 Rockwell and the cutting bevel has a hardness of 50-60 Rockwell. The body is softer so it can be bent to the desired shape needed. The bevel is much harder because the plate that is cuts the material against is also 55-60 Rockwell. The full body of the Creasing rule is 35-45 Rockwell. It is softer because all it is used for is to mark the material for where it has to fold.

The die block or the cutting-die assembly according to the present invention may be provided as a kit of elements to be assembled, optionally comprising instructions for assembling the elements. The instructions can also be presented as a plan or map indicating the position of each elements to be assembled.

Figure 14:
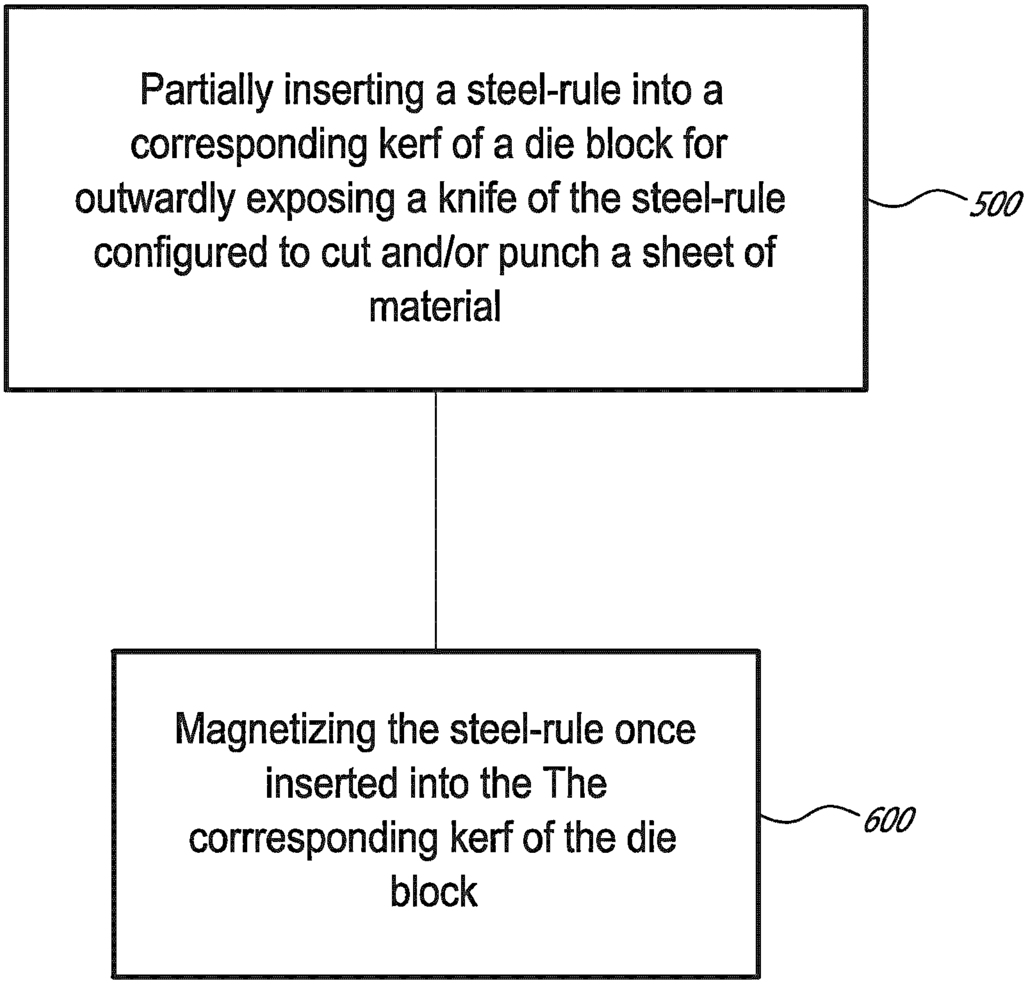
FIG. 14 is a flowchart diagram for illustrating a method for providing stability and alignment of a die block in accordance with a preferred embodiment.

As illustrated on FIG. 14, the invention is further directed to a method for providing stability and alignment of a die block intended to be used in collaboration with a press for cutting and/or punching a sheet of material. The method comprises the steps of:

- partially inserting a steel-rule into a corresponding kerf of the die block for outwardly exposing a knife of the steel-rule configured to cut and/or punch the sheet (500); and
- magnetizing the steel-rule once inserted into the kerf of the die block (600).

Figure 15:
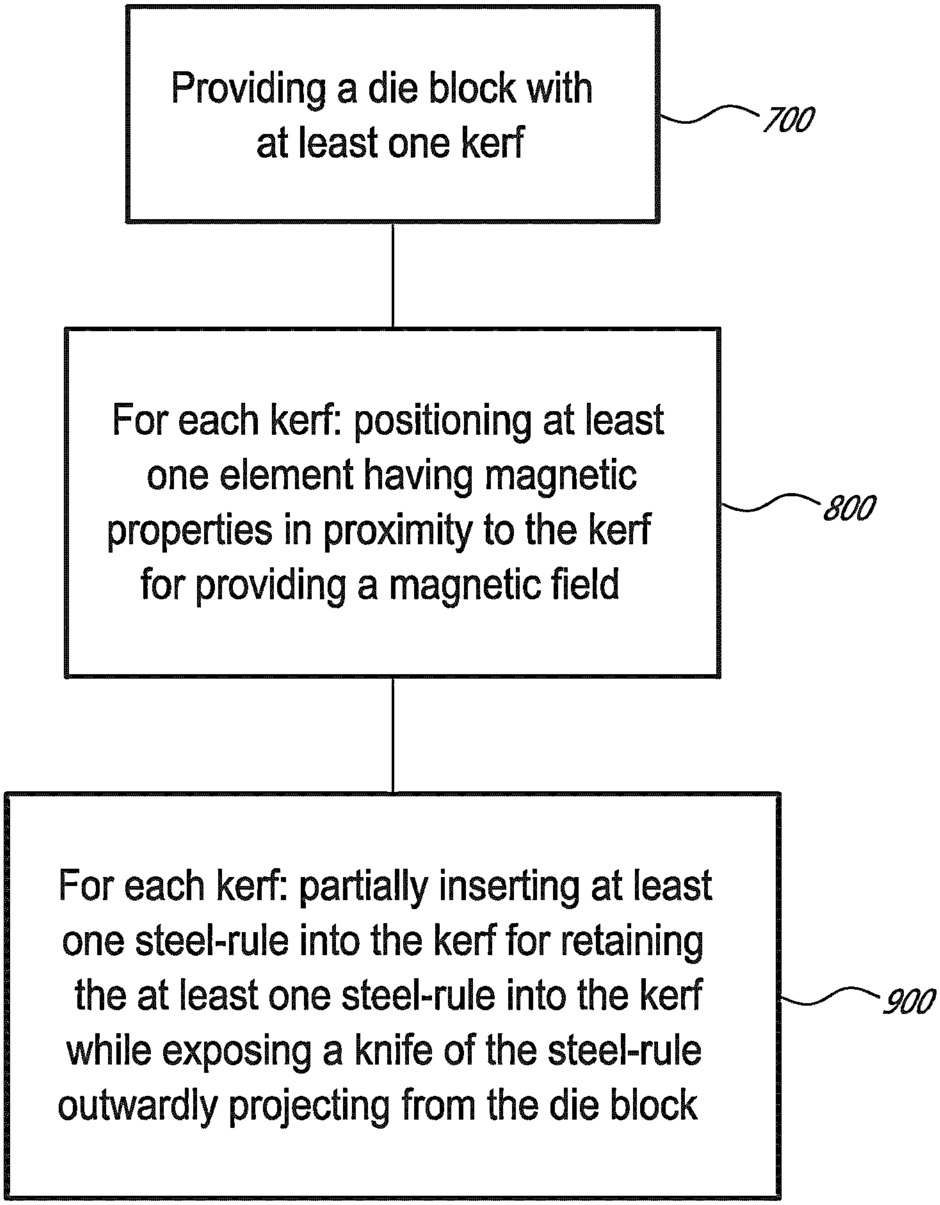
FIG. 15 is a flowchart diagram for illustrating a method of manufacturing a stabilized die block in accordance with a preferred embodiment.

As illustrated on FIG. 15, the invention is yet further directed to a method for manufacturing a stabilized die block intended to be used in collaboration with a press for cutting and/or punching a sheet of material. The method comprises at least the following steps:

- providing a die block with at least one kerf (700);
- and for each kerf
- positioning at least one element having magnetic properties in proximity to the kerf for providing a magnetic field (800); and
- partially inserting at least one steel-rule into the kerf for retaining the at least one steel-rule into the kerf while exposing a knife of the steel-rule outwardly projecting from the die block (900); the magnetic field stabilising and aligning each steel-rule once inserted into the kerf.

On a standard wood die, the cutting and creasing rules are held in tightly to keep it from falling out while the cutting-die is being run. This is very important since the die is run upside down in most auto-platen die cutting machines at speeds of up to 12,000 sheets per hour. Therefore, in order to keep the rule from falling out, the kerf was previously laser cut at around 0.026-0.027" (0.66-0.69 mm) and the cutting or creasing has an exact width of 0.028" (0.71 mm). Although this does not seem like a big difference, it can give quite a large expansion on the die. The more linear inches/meters of rule on the job, the more the die will expand. A die can expand as much as 0.05" (1.25 mm) which is completely unacceptable with today's standards of modern machinery. The maximum allowable when die cutting with a steel counter plate is 0.01" (0.25 mm). Also with weather wood can expand and contract which also affects dimensional stability. During dry season (winter/spring) the wood dries and the die can shrink slightly and also can make some of the rules loose thus allowing them to fall out of the die during a run which can cause big damage to the machine. During the (Summer/Fall) the die can swell from humidity and expand the size of the die. The magnetic device(s) located in proximity to the kerf(s) allow maintaining the corresponding rule(s) in position within its kerf even if the kerf is cut "loosely", that is to say with a corresponding kerf having a certain margin, so that the corresponding rule may be quickly and easily inserted and accurately maintained even if the die block expand or retract under atmospheric variations.

Self leveling: The present invention also allows reducing the number of times the cutting-die assembly needs to be re-ruled or re-knifed. Indeed, the presence of the magnetic element allows faster leveling of the die block on press. As explained above, a die is laser cut tighter when cut on wood. Because the die is cut tighter, it holds the rule tighter in the die, and as such does not allow the cutting rule to self-level. Since the rule cannot self-level, it becomes damaged faster and decreases the life of the die. Wood dies are rarely ever re-ruled because of the time needed for them and their loss of precision. So they are disposed (adding to land fill) and a new one is ordered. With the present invention (named Phantom™ Die by the Applicant), all of these problems are eliminated because the rules are held in position with the magnetic elements and the die is laser cut looser, for instance to about 0.030" (0.76 mm) giving the rule to sit properly on the press. The Phantom™ die also easily re-rules and always maintains stability. Also, because the die according to the present invention can be re-ruled easily all the changed metal rule may be recycled.

Also, by magnetizing the die block, the cutting-die assembly will have a better stability once inserted into the press due to the interaction between the magnetic elements concealed into the die block, and the structural elements of the press generally comprising ferromagnetic materials (iron).

Also, by magnetizing the die block, other material than wood or plywood generally used for the making of the cutting-die assembly, can be utilized for the manufacturing of the cutting-die assembly, such as plastic and foam material. The resulting cutting-die assembly is therefore lighter, more resistant, less subject to atmospheric variations and easier to transport.

While illustrative and presently preferred embodiment(s) of the invention have been described in detail hereinabove, it is to be understood that the inventive concepts may be otherwise variously embodied and employed and that the appended claims are intended to be construed to include such variations except insofar as limited by the prior art.

The invention claimed is:

1. A die block for die cutting, the die block comprising:
- a top surface;
- an opposite bottom surface;
- a main body extending between the opposite top and bottom surfaces;
- at least one kerf extending down within the main body and being provided about the top surface via a corresponding top groove, the at least one kerf and corresponding top groove being positioned, shaped and sized for receiving a corresponding die cutting rule; and
- at least one magnetic element having an elongated body with a given cross-sectional profile and a corresponding length, the length of the elongated body being greater than a maximal span within the cross-sectional profile taken along an imaginary median plane of the at least one magnetic element, and the at least one magnetic element being positioned, shaped and sized about the main body of the die block and in proximity of the at least one kerf for providing a magnetic field intended to retain the corresponding die cutting rule when placed into the at least one kerf;
- wherein the cross-sectional profile of the at least one magnetic element is either symmetrical or asymmetrical along a first imaginary median plane of the cross-sectional profile, and wherein the cross-sectional profile of the at least one magnetic element is further symmetrical or asymmetrical along a second imaginary median plane of the cross-sectional profile;
- wherein the cross-sectional profile of the at least one magnetic element comprises first and second distal sides;
- wherein the cross-sectional profile of the at least one magnetic element comprises front and rear longitudinal sides, with the front longitudinal side of the at least one magnetic element being shorter or no longer than the rear longitudinal side thereof; and
- wherein the cross-sectional profile of the at least one magnetic element is provided with peripheral corners between adjacent sides;
- wherein the opposite top and bottom surfaces of the die block are substantially horizontal top and bottom surfaces;
- wherein the at least one magnetic element includes at least one operative surface facing the at least one kerf;
- wherein the at least one operative surface of the at least one magnetic element is a substantially open surface;
- wherein the at least one operative surface of the at least one magnetic element is substantially facing the at least one kerf;
- wherein the at least one operative surface of the at least one magnetic element is substantially aligned with the at least one kerf;
- wherein a gap distance is provided between the at least one operative surface of the at least one magnetic element and a side surface of the corresponding die cutting rule when placed into the at least one kerf;
- wherein a gap distance is provided between the at least one operative surface of the at least one magnetic element and a corresponding wall of the at least one kerf;
- wherein the at least one magnetic element includes a plurality of magnetic elements provided along a length of the at least one kerf;
- wherein the at least one magnetic element includes at least one magnet; and
- wherein the at least one magnet is lodged into a corresponding recess of the main body of the die block;
- wherein the corresponding recess has a geometrical profile complementary to that of the at least one magnet, including a corresponding complementary cross-sectional shape;
- wherein the cross-sectional shape of the corresponding recess is either symmetrical or asymmetrical along a first imaginary median plane of the cross-sectional shape, and wherein the cross-sectional shape of the corresponding recess is further symmetrical or asymmetrical along a second imaginary median plane of the cross-sectional shape;
- wherein the cross-sectional shape of the corresponding recess comprises first and second distal sides;
- wherein the cross-sectional shape of the corresponding recess comprises front and rear longitudinal sides, with the front longitudinal side of the corresponding recess being shorter or no longer than the rear longitudinal side thereof; and wherein the cross-sectional shape of the corresponding recess is positioned, shaped and sized to prevent frontward egress of the at least one magnet, out from the corresponding recess, via an abutment of corresponding sides of the at least one magnet cooperating with corresponding sides of the corresponding recess.

2. A die block according to claim 1, wherein the die block comprises at least one of the following:

wherein a length of the corresponding recess corresponds substantially to a corresponding length of the at least one magnet;

wherein the corresponding recess has opposite first and second faces, with the first face being shorter or no longer than the second face, and with the first face being positioned, shaped and sized for being adjacent to the at least one kerf;

wherein the die block comprises top and bottom plates providing respectively the opposite top and bottom surfaces of the die block, and wherein the main body of the die block, as well as the at least one magnetic element, extend between said top and bottom plates;

wherein the top and bottom plates are resin-based laminates; and wherein the top plate has a plurality of top grooves, each top groove being each associated to a corresponding kerf.

3. A die block according to claim 1, wherein the cross-sectional profile of the at least one magnetic element is substantially trapezoidal.

4. A die block according to claim 1, wherein the peripheral corners of the at least one magnetic element include rounded corners.

5. A die block according to claim 1, wherein the cross-sectional profile of the at least one magnetic element comprises first and second angled sides.

6. A die block according to claim 1, wherein the at least one kerf is further positioned, shaped and sized so as to extend further down into the main body, and so as to be accessible about the bottom surface of the die block via a corresponding bottom groove.

7. A die block according to claim 1, wherein the at least one kerf is further positioned, shaped and sized with respect to the corresponding die cutting rule so that a bottom edge of said corresponding die cutting rule is substantially flush with the bottom surface of the die block when the corresponding die cutting rule is inserted into the at least one kerf.

8. A die block according to claim 1, wherein the die block comprises at least one plate extending between the at least one magnetic element and the corresponding die cutting rule.

9. A die block according to claim 1, wherein the at least one plate is magnetized.

10. A die block according to claim 1, wherein the at least one operative surface of the at least one magnetic element includes a substantially flat surface.

11. A die block according to claim 1, wherein the at least one operative surface of the at least one magnetic element is substantially parallel to the at least one kerf.

12. A die block according to claim 1, wherein the at least one operative surface of the at least one magnetic element is substantially aligned with the at least one kerf.

13. A die block according to claim 1, wherein the at least one magnetic element includes at least one magnet, having a magnetic force selected from the group consisting of N35, N38, N40, N42, N45, N48, N50, N52 and N55.

14. A die block according to claim 1, wherein the cross-sectional shape of the corresponding recess comprises first and second angled sides.

15. A die block according to claim 1, wherein the cross-sectional shape of the corresponding recess comprises front and rear parallel sides, with the front parallel side of the corresponding recess being shorter or no longer than the rear parallel side thereof.

16. A die block according to claim 1, wherein the cross-sectional shape of the corresponding recess is substantially trapezoidal.

17. A die block according to claim 1, wherein the cross-sectional shape of the corresponding recess is provided with rounded corners between adjacent sides.

18. A die block according to claim 1, wherein the die block comprises at least one of the following:

wherein the die block comprises at least one abutment body provided about the main body, and being positioned, shaped and sized for abutting against a corresponding side surface of the at least one magnetic element;

wherein the die block comprises at least one supporting body provided about the main body, and being positioned, shaped and sized for supporting a corresponding bottom surface of the at least one magnetic element;

wherein the at least one abutment body associated to the main body is made of foam;

wherein the at least one supporting body associated to the main body is made of foam;

wherein the main body, as well as the at least one abutment body and the least one supporting body, constitute one single common body;

wherein the one single common body is continuous along a length at least one kerf, from one magnetic element to another.

19. A die block according to claim 1, wherein the die block comprises at least one of the following:

wherein the at least one kerf is laser-cut;

wherein the corresponding die cutting rule is a steel-rule;

wherein the corresponding die cutting rule is provided with a corresponding distal edge acting as a knife.

20. A die block for die cutting, the die block comprising:

a top surface;

an opposite bottom surface;

a main body extending between the opposite top and bottom surfaces;

at least one kerf extending down within the main body and being provided about the top surface via a corresponding top groove, the at least one kerf and corresponding top groove being positioned, shaped and sized for receiving a corresponding die cutting rule; and at least one magnetic element having an elongated body with a given cross-sectional profile and a corresponding length, the length of the elongated body being greater than a maximal span within the cross-sectional profile taken along an imaginary median plane of the at least one magnetic element, and the at least one magnetic element being positioned, shaped and sized about the main body of the die block and in proximity of the at least one kerf for providing a magnetic field intended to retain the corresponding die cutting rule when placed into the at least one kerf;

wherein the cross-sectional profile of the at least one magnetic element is either symmetrical or asymmetrical along a first imaginary median plane of the cross-sectional profile, and wherein the cross-sectional profile of the at least one magnetic element is further asymmetrical along a second imaginary median plane of the cross-sectional profile;

wherein the cross-sectional profile of the at least one magnetic element comprises first and second angled sides;

wherein the cross-sectional profile of the at least one magnetic element comprises front and rear parallel sides, with the front parallel side of the at least one magnetic element being shorter or no longer than the rear parallel side thereof;

wherein the cross-sectional profile of the at least one magnetic element is substantially trapezoidal;

wherein the cross-sectional profile of the at least one magnetic element is provided with rounded corners between adjacent sides;

wherein the at least one kerf is further positioned, shaped and sized so as to extend further down into the main body, and so as to be accessible about the bottom surface of the die block via a corresponding bottom groove;

wherein the at least one kerf is further positioned, shaped and sized with respect to the corresponding die cutting rule so that a bottom edge of said corresponding die cutting rule is substantially flush with the bottom surface of the die block when the corresponding die cutting rule is inserted into the at least one kerf;

wherein the die block comprises at least one plate extending between the at least one magnetic element and the corresponding die cutting rule;

wherein the at least one plate is magnetized;

wherein the opposite top and bottom surfaces of the die block are substantially horizontal top and bottom surfaces;

wherein the at least one magnetic element includes at least one operative surface facing the at least one kerf;

wherein the at least one operative surface of the at least one magnetic element is a substantially flat surface;

wherein the at least one operative surface of the at least one magnetic element is substantially parallel to the at least one kerf;

wherein the at least one operative surface of the at least one magnetic element is substantially aligned with the at least one kerf;

wherein a gap distance is provided between the at least one operative surface of the at least one magnetic element and a side surface of the corresponding die cutting rule when placed into the at least one kerf;

wherein a gap distance is provided between the at least one operative surface of the at least one magnetic element and a corresponding wall of the at least one kerf;

wherein the at least one magnetic element includes a pair of magnetic elements at opposites ends of the at least one kerf;

wherein the at least one magnetic element includes a plurality of magnetic elements provided along a length of the at least one kerf;

wherein the at least one magnetic element includes at least one magnet;

wherein the at least one magnet has a longitudinal length with a transversal cross-sectional shape being substantially trapezoidal;

wherein the at least one magnet is lodged into a corresponding recess of the main body of the die block;

wherein the corresponding recess has a geometrical profile complementary to that of the at least one magnet, including a corresponding complementary cross-sectional shape;

wherein the cross-sectional shape of the corresponding recess is complementary to that of the at least one magnetic element;

wherein the cross-sectional shape of the corresponding recess comprises first and second angled sides;

wherein the cross-sectional shape of the corresponding recess comprises front and rear parallel sides, with the front parallel side of the corresponding recess being shorter or no longer than the rear parallel side thereof;

wherein the cross-sectional shape of the corresponding recess is positioned, shaped and sized to prevent frontward egress of the at least one magnet, out from the corresponding recess, via an abutment of angled sides of the at least one magnet cooperating with corresponding sides of the corresponding recess;

wherein the cross-sectional shape of the corresponding recess is substantially trapezoidal;

wherein the cross-sectional shape of the corresponding recess is provided with rounded corners between adjacent sides;

wherein a length of the corresponding recess corresponds substantially to a corresponding length of the at least one magnet;

wherein the corresponding recess has opposite first and second faces, with the first face being smaller than the second face, and with the first face being positioned, shaped and sized for being adjacent to the at least one kerf;

wherein the die block comprises top and bottom plates providing respectively the opposite top and bottom surfaces of the die block, and wherein the main body of the die block, as well as the at least one magnetic element, extend between said top and bottom plates;

wherein the top and bottom plates are resin-based laminates;

wherein the top plate has a plurality of top grooves, each top groove being each associated to a corresponding kerf;

the bottom plate has a plurality of bottom grooves, each bottom groove being each associated to a corresponding top groove;

wherein the main body of the die block is made of foam;

wherein the die block comprises at least one abutment body provided about the main body, and being positioned, shaped and sized for abutting against a corresponding side surface of the at least one magnetic element;

wherein the die block comprises at least one supporting body provided about the main body, and being positioned, shaped and sized for supporting a corresponding bottom surface of the at least one magnetic element;

wherein the at least one abutment body associated to the main body is made of foam;

wherein the at least one supporting body associated to the main body is made of foam;

wherein the main body, as well as the at least one abutment body and the least one supporting body, constitute one single common body;

wherein the one single common body is continuous along a length at least one kerf, from one magnetic element to another;

wherein the at least one kerf is laser-cut;

wherein the corresponding die cutting rule is a steel-rule; and wherein the corresponding die cutting rule is provided with a corresponding distal edge acting as a knife.

* * * * *